Apr. 24, 1923.
P. H. DORSEY
1,453,092
CUSHION WHEEL
Filed Oct. 2, 1920
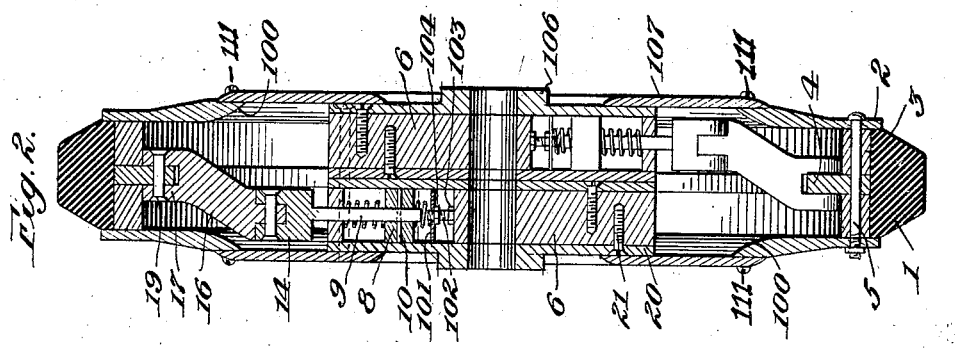
Inventor:
Philip H. Dorsey,
by Wm H Babcock & Son
Attys.

Patented Apr. 24, 1923.

1,453,092

UNITED STATES PATENT OFFICE.

PHILIP H. DORSEY, OF ALGIERS, LOUISIANA.

CUSHION WHEEL.

Application filed October 2, 1920. Serial No. 414,295.

*To all whom it may concern:*

Be it known that PHILIP H. DORSEY, a citizen of the United States, residing at Algiers, in the parish of Orleans and State of Louisiana, has invented certain new and useful Improvements in Cushion Wheels, of which the following is a specification.

The present invention relates to resilient wheels and more particularly to wheels of the spring wheel type in which the tire is yieldingly supported about the hub by means of connections including springs or equivalent means adapted to take up or absorb shocks received by the tire and prevent their transmission to the hub and, through it, to the vehicle body.

One of the objections to existing wheels of this type is that they are not sufficiently sensitive and, therefore, only very imperfectly absorb the shocks. Another objection is the complexity of the connections between the hubs and tires or outer wheel members. A further objection is the weakness of these connections for effecting a drive of the tire from the hub. Furthermore, inability to adjust or regulate the operating force of the absorbing springs is a serious disadvantage in previous wheels of this type. Lack of means for adequately lubricating the moving parts, especially where the greatest friction occurs, is a further handicap in such wheels. One of the most serious objections is the lack of means for protecting from dust and grit, the various operating parts. An additional objection to wheels of this type is the weakness of resistance to the side thrusts in making a turn or rounding corners. Among the forms of this type involving the above objections is the form having telescopic spoke sections, one section pivoted or otherwise connected at one end to the hub and receiving the other section, while such other section is pivoted to the inner face of the felly or tire, the spring or other shock absorbing element being disposed between them. The purpose of this invention is to overcome these and other objections and provide a wheel of this type which is simply constructed and may be quickly manufactured at a reasonable cost.

In order to more clearly disclose the invention, a preferred form is shown in the accompanying drawings and will be more fully set forth in the following specification and claim, though it is clear that many structural changes and changes in the arrangements of various parts may be made without in any degree departing from the field and scope of the invention, and it is meant to include them within the scope of the appended claim.

In the drawings:—

Fig. 1 is a side elevation with the casing removed from one half of the wheel, and one hub element partly broken away; and Fig. 2 is a cross section on line 2—2 of Fig. 1.

In the present wheel the tire comprises the tread 1 clamped between the side ring plates 2, which are kept in their spaced relation by the felly sections 3, between which is held a connecting or driving ring 4. The parts 1, 2, 3, and 4 are all secured together to form a unitary structure or tire by means of securing bolts 5 passing laterally through members 2, 3, and 4. The rings 2 are of considerable width and extend considerably beyond the felly toward the hub. The inner face of each plate is beveled or feathered toward the outer face to a considerable depth and throughout the entire circumference as at 100, for a purpose to be later disclosed. The hub comprises two simple duplicate castings 6, each having a plurality of radially disposed oblong openings or spring receiving pockets 7, and each opening in turn has an inwardly extending radially disposed notch 13 for a purpose to be later disclosed. In the outer circumferential face of each casting and in line with the longitudinal centre of each opening 7, and communicating therewith, is formed a small bore for a purpose to be later disclosed. Within each opening 7 and having a close sliding fit between the walls thereof is a guide block 8 through the centre of which extends a post 9. Each block is fixed to its post by a connecting pin 10 in such manner that there can be no relative motions between them. Disposed about each post are two coil springs 11 and 12, one arranged between the block 8 and the outer or circumferential wall of the opening 7, and the other between the block and the bottom or inner wall of the notch 13. The springs are so balanced as to normally keep each block about midway of the combined length of its opening 7 and the notch 13, as will be readily understood. In order to regulate the operating force of each spring 12, for properly positioning blocks 8, a small plate 101 is used. One of these plates is slidably mounted in each notch 13 and adapted to seat or support the lower end of spring 12. The plates are provided with centrally disposed holes for the upper ends of short screw threaded studs or short bolts 102. On the lower end of each stud or bolt is a head 103 adapted to act as a support to steady it. Above the head and adapted to engage the under face of plate 101, is an adjusting nut 104 adapted by being turned in one or the other direction, to compress or extend the spring, thereby increasing or decreasing the operative force of the spring, as will be readily understood. During the travel of the wheel, the rapid sliding movement of blocks 8 in their pockets cause considerable friction. To overcome this, it is necessary to lubricate, adequately. For this purpose, each pocket is provided with a feed bore adapted to be closed by a small screw plug 105. Through these bores a suitable quantity of lubricating oil may be put into each pocket. To insure the oil getting between the block and the wall or face of the pocket and also getting into the lower part of the pocket and into the notch 13, each vertical wall or face of each block 8, or one or more of the faces, is provided with one or more grooves 8' through which the oil passes freely. During the travel of the wheel the blocks 8, working back and forth act somewhat in the nature of pump plungers to maintain a forced circulation of the lubricant. The outer end of each of the aforesaid posts is provided with a U-shaped forked end 14 which receives the reduced inner end 15 of a diagonally disposed radially extending spoke 16 terminating in an outer radially disposed U-shaped fork 17. A pivot pin 18 provides flexible connection between the reduced end 15 and fork 14. Fork 17 is similarly flexibly connected to the driving ring 4 by a pivot pin 19. Caps or plates 20 secured to the opposite faces of each casting or block by screws 21 or other suitable means serve to complete the hub elements and close the side wall openings of the pockets and notches. The two hub elements are secured together by screws 22 passed from opposite sides through one and threaded into the other, or bolts may be run clear through both, and nuts turned upon the projecting ends, or any other suitable fastening means may be used. Each cap has a raised annular central portion 106 through the centre of which passes the axle opening or bore.

In order to completely enclose all of the working parts and thoroughly protect them against dirt, dust, or grit, which would soon seriously affect the joints, annular casing plates 107 are used. These fit about and receive the portions 106 and extend from them to and beyond the edges of plates 2, providing an overlapping zone through which screws, bolts or other suitable fastening devices 111 may be passed to secure the members 107 and 2 together to make each side of a complete casing. The bevelled edge 100, heretofore mentioned, is of sufficient extent and bevel to permit free motion of the spoke elements and their pivotal points without binding or rubbing against the casing wall. On the other hand, should one of the pivotal joints become slightly weak and tend to spread outwardly, the casing will engage and support it, thereby acting as a guide and brace, as well as a casing.

In securing the hub elements together they are so disposed relatively to each other that the openings 7 of one will alternate with those of the other, all of the openings being equally spaced circumferentially about the centre of the wheel. On reference to Fig. 2 it will be seen that the offset of the spoke sections of one hub element is in a direction opposite to that of the spoke sections of the other hub element. This together with the alternation, above set forth, places the points of connection between ring 4 and the spoke sections in direct radial lines from the centre of the wheel to the centre of the tire. At the same time it provides one set of spoke sections disposed to resist side thrust from one direction, as in turning a corner, and another and similar set disposed to resist side thrust from the opposite direction, as in turning a corner in the opposite direction.

The two pivot pins 18 and 19 and the connecting pin 10 in each instance are parallel and in the same plane, which is radial with relation to the wheel. Also they are at right angles to the radius and to the ring 4. Consequently the only movements allowed each post 9 are simple inward and outward movements toward and from the tire and wheel centre, or radially. No turning movement of any kind is possible, because of block 8 fixed by pin 10. Likewise the only movement of each spoke section is a rocking movement about the two pivotal connections 18 and 19 at the same angle to both and in the direction of the circumference of the wheel. The pivot connections prevent any other rocking, turning or twisting movements. Thus a limited cushioned or yielding inward movement against the power of the shock absorbing springs is allowed whenever the tire meets an obstacle, while at the same time every other movement is stoutly resisted and prevented. The yielding connections between the spoke sections and driving ring and sliding posts respectively, provide adequate means for transmitting the driving power from the hub to the tire, and vice versa. At the same time their flexibility dispels the first sudden shocks of the impact of the tire against any unevenness or obstructions met. Shocks thus received and partially dispelled are transmitted through the flexible connections to the absorbing springs, where they are practically entirely eliminated.

Although the hub has been shown as comprising two elements connected together, it is clear that it could be made as a single casting complete, or each element could have one of the face plates cast integral with the body portion, the other only, being separate. Likewise, the plates 2 may be made as several annular plates or rings, the inner one having the bevelled edge 100, and, in addition, such plates may each be made segmental, or the single plate on each side may be made segmental. The casing plates 107 may be either complete annular plates, or segmental, in the same manner.

Obviously many changes may be made in structural details, as also in the disposition of the several parts, without in any manner departing from the field and scope of the invention, and it is meant to include all such within the scope of the appended claim.

Having thus described my invention, what I claim and desire to protect by Letters Patent is:—

A resilient wheel comprising a hub-block provided with a series of pockets in combination with a series of compression blocks slidably mounted in said pockets, a post carried by each block, resilient means acting oppositely on said compression blocks, a felly, a driving ring extending radially inward therefrom and disposed mid-way between the opposite sides of said felly, a plurality of spoke sections alternately radially oppositely offset, pivotal connections between one end of each of said spoke sections and said drive ring, pivotal connections between the opposite end of each spoke section and one of the aforesaid posts, rings connected to said felly and extending radially inward and having their inner edges bevelled to provide clearance for the aforesaid spoke section in their flexing movements, annular casing plates slidably engaging said hub-block, each said plate being provided with a large central opening permitting easy access to the hub cap and end of the axle while all parts of the wheel and casing are in assembled relation, and connections between said casing plates and the aforesaid rings.

In testimony whereof, I have signed my name to this specification in the presence of two subscribing witnesses.

PHILIP H. DORSEY.

Witnesses:
L. E. YOUNG,
CHAS. DOBBINS.